D. S., I. D. & W. D. HEEBNER.
Endless-Chain Horse-Powers.

No. 158,078.  Patented Dec. 22, 1874.

UNITED STATES PATENT OFFICE.

DAVID S. HEEBNER, ISAAC D. HEEBNER, AND WILLIAM D. HEEBNER, OF LANSDALE, PENNSYLVANIA.

IMPROVEMENT IN ENDLESS-CHAIN HORSE-POWERS.

Specification forming part of Letters Patent No. 158,078, dated December 22, 1874; application filed November 14, 1874.

*To all whom it may concern:*

Be it known that we, DAVID S. HEEBNER, ISAAC D. HEEBNER, and WILLIAM D. HEEBNER, all of Lansdale, in the county of Montgomery, and State of Pennsylvania, have invented certain new and useful Improvements in Endless-Chain Horse-Powers; and we do hereby declare the following to be a full, clear, and exact description of the invention, such as will enable others skilled in the art to which it pertains to make and use it, reference being had to the accompanying drawings, which form part of this specification, in which—

Figure 1:
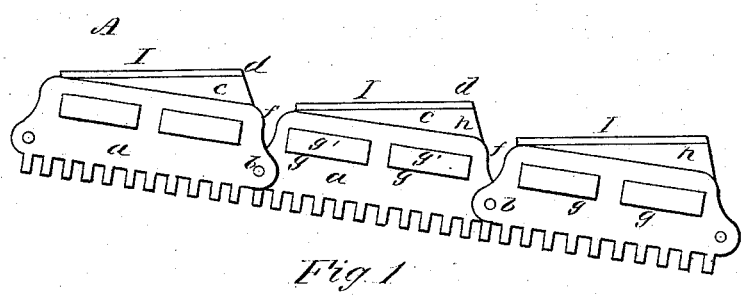
Figure 2:
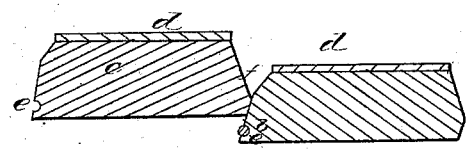

Figure 1 is a side view, and Fig. 2 is a vertical longitudinal section, of our invention.

This invention has relation to the endless traveling-platforms of horse-powers, and is designed to accomplish a twofold object, viz.:

First, to prevent the shoes of the horse from catching between the tread-board and coming in contact with the transverse connecting-rods of the platform.

Secondly, to relieve the jar or jolt caused by the heavy tramp of the horse.

For the purposes of our invention, we arrange the steps or tread-boards in close relation, or in contact, upon the platform; and we arrange the same in different horizontal planes, and form a groove or rabbet in the upper edge of each for the reception of the transverse connecting-rod, which ordinarily necessitates leaving an open space between the two adjoining boards, and which after a short time enlarges from the wearing of the boards, allowing the horse to step upon the rod and so bend it as to materially injure the platform, and impair its working qualities.

To prevent the horse's shoes from being caught between the boards we bevel their upper edges in an appropriate manner, so as to provide recesses from which the horse may readily withdraw his shoes. To render the tread horizontal, we cut the tenons which enter the link-mortises obliquely with respect to the surfaces of the tread-boards. The jolting or jar resulting from the heavy stepping of the horse we relieve by properly cushioning the upper surfaces of the boards.

Referring to the accompanying drawings, A designates a section of our improved platform, in which $a$ $a$ are the links, $b$ $b$ the transverse connecting hinge-rods, $c$ $c$ the tread-boards, and $d$ $d$ the cushions. $e$ $e$ are grooves in the upper or forward edge of the tread-boards to receive the rods $b$ $b$, and $ff$ are angular recesses or channels terminating the tread-surfaces of the boards, and designed to prevent the horse's shoes from being caught as the joints open and close. From the bottom of said channels the upper edge of each board is beveled or inclined outwardly, and the lower edge beveled or inclined inwardly, as shown, so that the adjoining edges of two boards will correspond and admit of a close joint being formed and the connecting-rod protected, as shown in the drawings. $g$ $g$ are mortises formed in the links for the reception of the tenons $g'$ $g'$ cut obliquely on the ends of the boards, so that while said tenons coincide with the inclination of the links the surfaces or tread of the boards will be horizontal. $h$ $h$ are ledges formed in cutting the tenons, and adapted to project over the edges of the links, as shown. I I designate cushions, of india-rubber or other suitable material, applied to the tread-boards for the purpose before stated.

Having described our invention, we claim—

1. The endless-chain platform, having the adjoining edges of the tread-boards correspondingly beveled or inclined to produce close joints and protect the connecting-rods, substantially as shown and described.

2. The channels or recesses formed at the edges of the tread-boards of an endless platform, having close joints, substantially as described.

In testimony that we claim the foregoing, we have hereunto set our hands this 30th day of October, 1874.

DAVID S. HEEBNER.
ISAAC D. HEEBNER.
WILLIAM D. HEEBNER.

Witnesses:
AMOS JOHNSON,
JONAS M. BOORSE.